Patented Nov. 3, 1931

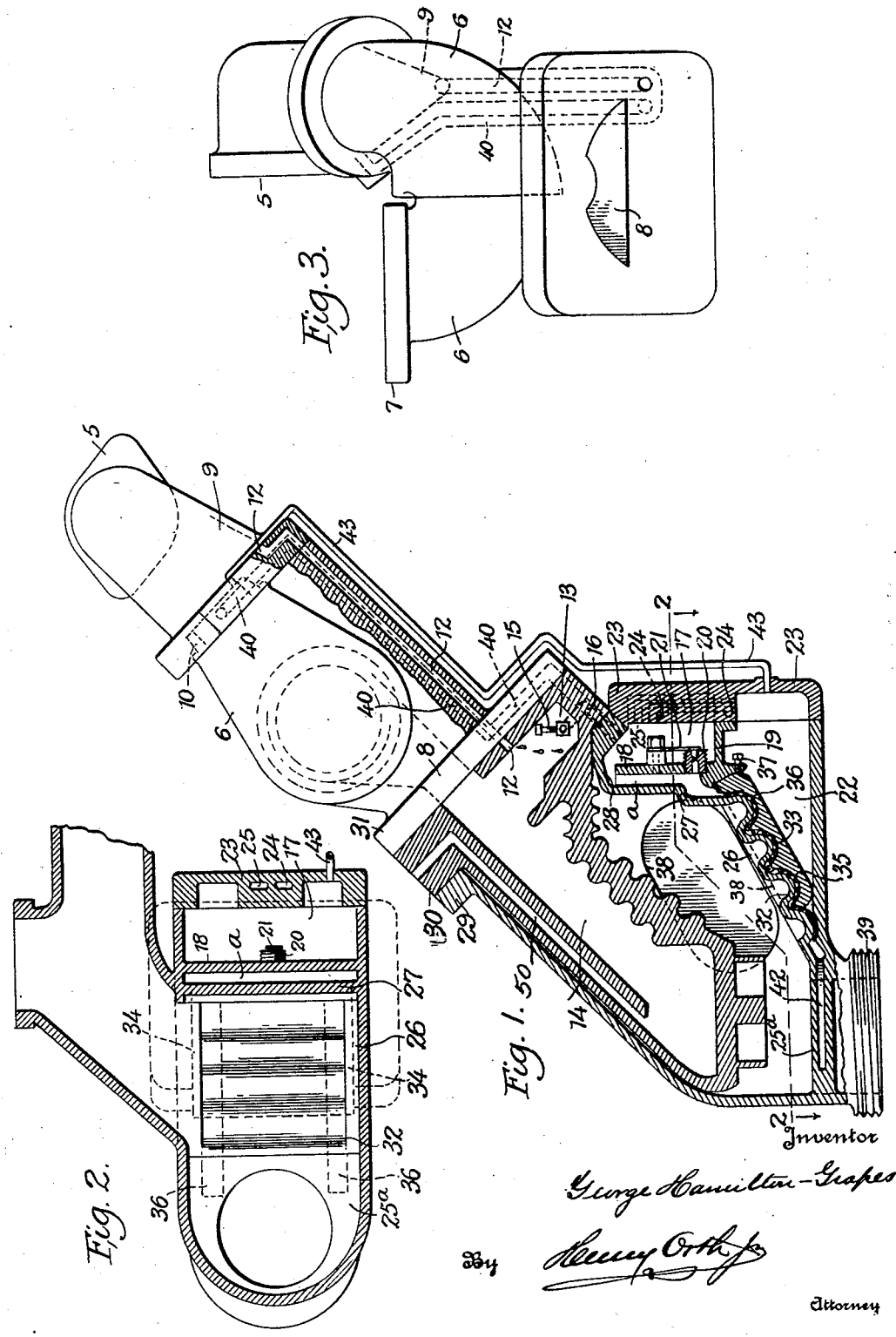

1,830,360

UNITED STATES PATENT OFFICE

GEORGE HAMILTON-GRAPES, OF MURRUMBEENA, VICTORIA, AUSTRALIA

SEPARATOR AND VAPORIZER FOR INTERNAL COMBUSTION ENGINES

Application filed March 7, 1929, Serial No. 345,155, and in Great Britain July 7, 1923.

My invention relates to improvements in devices for centrifugally separating heavy fuel particles from carburetted mixtures, and vaporizing the separated particles, and feeding the heavy vapors into the main stream mixture.

The problem has been to prevent gorging of the engine by heavy fuel vapors from the retort when starting in cold weather, and to prevent crank case dilution during the starting period.

I solve this problem by trapping the liquid heavy hydrocarbons separated and vaporizing them as the engine heats up, and feeding the vapor of the heavy hydrocarbons gradually to the main mixture stream; and after the engine has become heated diverting the separated hydrocarbons to a retort, preferably automatically, which is heated by the exhaust gases from the engine.

The heavy liquid hydrocarbons are thus separated during the cold period of operation of the engine, are retained during this period, subsequently vaporized, and do not come into contact with the walls of the combustion chamber until they are so hot as to prevent re-condensation of any of the higher boiling hydrocarbons supplied to them, hence a very large degree of crank case oil dilution is avoided.

Referring to the drawings, in which like parts are similarly designated—

Figure 1 is a side elevation, partly in section, showing my improved vaporizing apparatus.

Fig. 2 is a plan view of a section on line 2—2, Fig. 1.

Fig. 3 is an elevation of the separator element.

The mixture from the carburetter enters the separator element at flange 5, takes a circular path through 180° in pipe 6 to flange 7 connected to the engine inlet manifold. Pipe 6 has an opening 8 about at its middle for delivering separated heavy liquid particles from the mixture stream passing to the engine, to a retort.

Ahead of the opening 8 and at the beginning of the 180° turn of pipe 6 is a trap 9 containing a ring 10 through which the mixture passes to pipe 6, and the major part of the unvaporized liquid in the mixture will be caught in the trap 9, from which a conduit 12 leads the liquid into a feeding trough 13 of a retort chamber 14, as described in my U. S. patent application Serial No. 261,578, filed March 14, 1928, and provided with an air inlet 50.

The collecting trough 13 is provided with a port, controlled by a thermostatic, normally open, valve 15 connected by a conduit 16 to a collection chamber 17. This chamber has a vertical partition 18 and a bottom 19. The vertical wall 18 has a screw-plug 20 containing a port, controlled by a normally closed thermostatic valve 21.

Below the collection chamber 17 is an overflow or storage chamber 22, and both chambers are closed by a plate 23 containing an overflow duct 24 and a mixture discharge duct 25, connecting the overflow chamber 22 with the collection chamber 17 at a level above the mouth of the overflow duct 24.

The roof of the overflow chamber has a horizontal portion 25$^a$, an inclined portion 26, a substantially vertical portion 27 and a connecting portion 28 connecting the roof to a flange 29, to which the flanges 30 of the retort chamber and 31 of the separator element are bolted or otherwise secured. This roof encloses and covers both the collecting chamber 17 and the overflow chamber 22. The vertical portion 27 is spaced from the vertical wall 18 of the collecting chamber 22 for exit of vapor of the separated heavy fuel fractions.

The inclined portion 26 of the roof of the collecting chamber has a series of corrugations 32 or similar formation, to increase the surface area. Below this corrugated portion is a tray 33 having side walls 34 between which are corrugations 35 that nest with the corrugations 32 of the inclined portion 26 of the roof. Between the corrugations 32 and 35 are laid strips of wire gauze 36, one at each side of the tray 33, and the tray is held in place by a set-screw 37. The gauze acts as a wick as well as a spacing means, to form a vaporizing channel, in which the heavy fractions are vaporized.

The retort chamber 14 is of the type described in my aforesaid patent application, and between it and the roof of the overflow chamber 22 is a considerable space for the entry of hot engine exhaust gases through the opening 38. These gases heat both the retort and the roof of the overflow chamber, and pass out of the device through the muffler connection 39.

In starting a cold engine the major part of the heavy liquid particles are separated, and collected in the trap 9 and flow through conduit 12 into the feeding trough, thence through valve 15 and conduit 16 into the collection chamber 17 and past valve 21 onto the wire gauze 36 and into the vaporizing channel between the two strips of gauze, where the heavy particles are heated by the corrugations 32 of the inclined portion 26 of the roof, heated by the hot exhaust gases entering through opening 38. The vapor rises along the corrugations between the tray 33 and corrugations 32 of the inclined portion 26, through the slot a into the top of the collecting chamber 17, thence through a duct 40 into the entrance of separator pipe 6.

If the engine is very cold and will not start, or for other reasons will not promptly come to normal running, valve 21 will not open, and heavy liquid will collect in the chamber 17 and rise to the overflow 24 and pass into the storage chamber 22. Some of this stored liquid will flow into a channel 42 partly surrounding the exhaust opening and be vaporized, its vapor following the path previously described. When the valve 21 becomes hot enough, it automatically opens to deliver liquid to the wire gauze strips and into the narrow space between them.

When the engine reaches normal running, valve 15 closes the discharge from the feeding trough, and allows the liquid to rise therein and overflow into the retort chamber, where the liquid is vaporized, and the vapor passes out through the mouth of the retort into the pipe 6. Any residual fractions that pass the trap 9 will enter the mouth of the retort directly at 8. After the valve 15 has closed, the wire gauze by capillary action gradually draws the liquid from storage chamber 22 and vaporizes it, while collecting chamber continues to discharge through valve 21 by gravity until all the liquid in both of these chambers has been vaporized.

My apparatus will vaporize any fractions having any dry point up to about 235° C.

As the liquid level rises in the overflow 22 it passes a suction tube 43 leading directly into the ring 10, as shown. This tube 43 is so dimensioned as not to prevent all the liquid being exhausted from the overflow chamber, thus by-passing excess liquid to the main mixture stream, and acts as anti-flooding means.

It will be noted that the collection chamber and the storage chamber act as insulators to retain the heat of the exhaust gases within the device for heating the retort, and thereby obtain a much higher heat in the retort and its toe, with the particular object in view of retaining this heat for vaporization of the heavy, separated liquid particles, particularly during starting and idling of the engine.

I claim—

1. Mechanism of the type described, comprising means to initially separate heavy fuel fractions from a carburetted fuel mixture as it is passing to an engine, a chamber through which exhaust gases pass, a collection chamber, means to supply said separated heavy liquid fuel to the collection chamber, means to supply the heavy fuel fractions over the exterior of the bottom of the chamber heated by exhaust gases, and means to return the vapor into the main mixture stream.

2. Mechanism of the type described, comprising means to initially separate heavy fuel fractions from a carburetted fuel mixture as it is passing to an engine, a collecting chamber, means to supply said fractions to the collecting chamber, a chamber through which engine exhaust gases pass having an inclined, corrugated bottom, a corrugated tray whose corrugations match with the underside of the corrugations of said bottom, and a valve to control the gravity supply of heavy fractions between the bottom and the tray, and means to supply the vapor of said fractions from between the matching corrugations to the mixture stream passing to the engine.

3. Mechanism of the type described, comprising means to separate heavy fuel fractions from a carburetted fuel mixture as it is passing to an engine, a collection chamber for said separated fuel, a chamber through which engine exhaust gases pass and having a corrugated inclined bottom, a tray fitting below the corrugations of said bottom, capillary means between the tray and bottom, a thermostatic valve to deliver fractions from the collection chamber by gravity between the corrugations of said bottom and tray, and means to deliver the vapor of said fractions to the main mixture stream.

4. Mechanism of the type described, comprising means to trap heavy liquid fuel particles from a carburetted fuel mixture as it passes to an engine, a collection chamber, means to supply the trapped liquid to said collection chamber, a chamber through which engine exhaust gases pass having an inclined bottom, an overflow chamber into which liquid of said collection chamber may overflow and said bottom forming the roof thereof, a wick member below said bottom, a member in the storage chamber to hold the wick member against said bottom and terminating at its lower ends in the storage chamber, a valve to control the flow of heavy liquid fuel by gravity to the space between said bottom and holding member, and means to return the vaporized heavy fuel fractions to the mixture stream passing to the engine.

5. Mechanism of the type described, comprising means to trap heavy liquid fuel particles from a carburetted fuel mixture passing to an engine, a collection chamber to which said trapped liquid is delivered by gravity, an overflow chamber into which the liquid in the collection chamber may overflow, a chamber through which engine exhaust gases pass and having an inclined bottom, means on the underside of said bottom forming a vaporizing channel, said channel extending to the bottom of the storage chamber and said storage chamber having an extension partly surrounding the exit of the exhaust gases, a valve to control the gravity discharge of liquid to said vaporizing channel, and means to deliver the vapor from said channel into the mixture passing to the engine.

6. Mechanism of the type described, comprising means to trap liquid particles from a carburetted fuel mixture passing to an engine, a chamber through which engine exhaust gases pass, a retort therein arranged to deliver vapor to said mixture, a feeding trough for said retort, a collection chamber, a valve to control the delivery of liquid from said trough to the collection chamber, another valve in the collection chamber to control the discharge of liquid onto the exterior surface of the chamber through which the exhaust gases pass, said first valve operable to cut off the supply of liquid to the collecting chamber and permit it to be diverted into said retort, and means to deliver the vapor arising from the exterior of said exhaust chamber to the mixture passing to the engine.

7. Mechanism of the type described, comprising means to trap liquid particles from a carburetted fuel mixture passing to an engine, a collection chamber to which the liquid is delivered, a chamber through which engine exhaust gases pass, a valve to control the delivery of liquid from the collection chamber onto the exterior of said exhaust gas chamber, means to deliver the vapor arising from the liquid on the exterior of the exhaust gas chamber to the mixture passing to the engine, an overflow chamber to receive liquid from the collection chamber, and a pipe above the bottom of the overflow chamber to deliver a small excess quantity of the liquid in the overflow chamber back into the mixture passing to the engine.

8. Mechanism of the type described, comprising means to trap liquid particles from a carburetted fuel mixture passing to an engine, a collection chamber to which the liquid is delivered, a chamber through which engine exhaust gases pass, a valve to control the delivery of liquid from the collection chamber onto the exterior of said exhaust gas chamber, means to deliver the vapor arising from the liquid on the exterior of the exhaust gas chamber to the mixture passing to the engine, an overflow chamber to receive liquid from the collection chamber, a pipe above the bottom of the overflow chamber to deliver a small excess quantity of the liquid in the overflow chamber back into the mixture passing to the engine, and a retort in said exhaust gas chamber open to the mixture passing to the engine at a point beyond the trapping point.

9. Mechanism of the type described, comprising means to trap liquid particles from a carburetted fuel mixture passing to an engine, a feeding trough to which the trapped liquid is delivered, a collecting chamber, a thermostatic valve closed by high temperature controlling the delivery of liquid from the trough to the chamber, a chamber through which exhaust engine gases pass having an inclined bottom, spaced capillary means on the exterior of said bottom, an overflow chamber to receive overflow from the collecting chamber, means in the overflow chamber to hold said capillary means against the exterior of said inclined bottom, a thermostatic valve opened when heated to discharge liquid by gravity between the capillary means, said capillary means entering the liquid in the overflow chamber, a retort in the exhaust gas chamber, means to return the liquid vapor to the mixture passing to the engine, said first valve closing when the engine has reached normal running to permit said trough to overflow into the retort, the vapor from said retort entering the mixture passing to the engine at a point beyond the point of trapping, and means to return liquid from the capillary means and vapor from the collection chamber and the overflow chamber to said mixture.

In testimony that I claim the foregoing as my invention, I have signed my name hereto.

GEORGE HAMILTON-GRAPES.